United States Patent
Dickenson et al.

(10) Patent No.: US 9,335,794 B2
(45) Date of Patent: *May 10, 2016

(54) CONFIGURABLE ERGONOMIC KEYBOARD FOR COMPUTING DEVICES

(71) Applicant: International Business Machines Corporation, Armonk, NY (US)

(72) Inventors: Gary I. Dickenson, Tucson, AZ (US); Richard Hutzler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,629

(22) Filed: Nov. 20, 2014

(65) Prior Publication Data

US 2015/0116223 A1    Apr. 30, 2015

Related U.S. Application Data

(62) Division of application No. 13/732,724, filed on Jan. 2, 2013.

(51) Int. Cl.
| | |
|---|---|
| *G06F 3/02* | (2006.01) |
| *G06F 1/16* | (2006.01) |
| *B41J 5/10* | (2006.01) |

(52) U.S. Cl.
CPC .................. *G06F 1/1664* (2013.01); *B41J 5/10* (2013.01); *G06F 1/1666* (2013.01); *G06F 1/1667* (2013.01); *G06F 3/0208* (2013.01); *G06F 3/0216* (2013.01)

(58) Field of Classification Search
CPC ..... G06F 3/0208; G06F 3/0216; G06F 1/1667; G06F 1/1664; G06F 1/1666; G06F 3/0221
USPC ............................................ 400/472, 489, 82
See application file for complete search history.

(56) References Cited

U.S. PATENT DOCUMENTS

| | | |
|---|---|---|
| 5,393,150 A | 2/1995 | Fort |
| 5,466,078 A | 11/1995 | Szmanda et al. |
| 5,613,786 A | 3/1997 | Howell et al. |
| 5,788,386 A | 8/1998 | Hayashi et al. |
| 5,847,695 A | 12/1998 | Duncan et al. |
| 5,936,555 A | 8/1999 | Zagnoev |
| 7,173,814 B2 | 2/2007 | Cohen et al. |
| 2003/0197628 A1 | 10/2003 | Hsu |
| 2010/0245250 A1 | 9/2010 | Linegar et al. |
| 2012/0112931 A1 | 5/2012 | May |

FOREIGN PATENT DOCUMENTS

| | | | |
|---|---|---|---|
| EP | 0773493 A2 | 5/1997 |
| EP | 0773493 A3 | 10/1997 |
| EP | 0898221 B1 | 12/2001 |

OTHER PUBLICATIONS

U.S. Appl. No. 13/732,724, entitled "Configurable Ergonomic Keyboard for Computing Devices", filed Jan. 2, 2013.
U.S. Appl. No. 14/548,774, entitled "Configurable Ergonomic Keyboard for Computing Devices", filed Nov. 20, 2014.

*Primary Examiner* — Justin Olamit
(74) *Attorney, Agent, or Firm* — Isaac J. Gooshaw

(57) ABSTRACT

A configurable keyboard. The configurable keyboard includes a base with a top face, and a top edge. A position adjustable panel containing keyboard keys. The position adjustable panel is attached to the base by a position adjustment device. The position adjustment device includes a shaft and a first connector. The shaft is attached, towards a bottom end, to the base. The first connector connects the position adjustable panel to the shaft.

17 Claims, 8 Drawing Sheets

CONFIGURABLE ERGONOMIC KEYBOARD FOR COMPUTING DEVICES

FIELD OF THE INVENTION

The present invention relates generally to the field of computers, and more particularly to configurable ergonomic keyboards for computing devices.

BACKGROUND OF THE INVENTION

An ergonomic keyboard is a computer keyboard designed with ergonomic features which can minimize the degree of muscle strain, and a host of related problems, experienced by a user. Typically such keyboards are constructed in a V shape to allow right and left hands to type at a slight angle which can be more natural and comfortable to the human form.

Standard computer keyboards have evolved into devices having a plurality of alphanumeric and function keys. The inclusion of the numerous keys requires standard keyboards to be relatively large and of a substantial weight. This size and weight is further exacerbated with the inclusion of ergonomic features in the design of keyboards. As a desktop environment typically has less demanding size and weight restrictions as compared to a portable or laptop computer, these restrictions do not present a significant drawback in standard desktop computer design. However, this is not the case with most laptop computers.

Laptop computers are designed, by definition, to be portable. Thus, laptop computer design is constrained by device size and weight. These constraints dictate a compact size keyboard which typically incorporates a limited number of function keys and which, by necessity, does not typically include a numeric keypad or ergonomic design features. Given the general design constraints of size and weight, the keyboards included with most laptop computers are not ergonomic and may be un-natural, uncomfortable, and potentially damaging to the bodies of users.

SUMMARY

The present invention is directed to a configurable keyboard, facilitating ergonomic configuration and compact storage of the configurable keyboard.

The configurable keyboard of the present invention includes a base with a top face, and a top edge. A position adjustable panel containing keyboard keys. The position adjustable panel is attached to the base by a position adjustment device. The position adjustment device includes a shaft and a first connector. The shaft is attached, towards a bottom end, to the base. The first connector connects the position adjustable panel to the shaft.

The keyboard in use has multiple planes and degrees of freedom allowing for adjustable ergonomic configurations to be made to the keyboard. When the keyboard is not in use, a user can collapse the keyboard into a more compact configuration to facilitate transport.

BRIEF DESCRIPTION OF THE SEVERAL VIEWS OF THE DRAWINGS

In the drawings, wherein like reference characters denote similar elements throughout the several views.

DETAILED DESCRIPTION

Two common types of ergonomic keyboards are fixed-split ergonomic keyboards and adjustable-split ergonomic keyboards. A fixed-split ergonomic keyboard is a single keyboard, with the keys separated into groups, allowing the user to type with their hands and wrists at a different angle than the typical straight keyboard. An adjustable-split ergonomic keyboard has the keyboard split into independent pieces, typically within a single plane and with a single axis of rotation, such that the angle separating the pieces can be customized. An adjustable-split ergonomic keyboard does provide a level of customizability to a user. However, this customizability is often limited to a single plane or axis of movement and usually can not be incorporated into the design of a laptop computer. A more fully ergonomic keyboard can be created if multiple planes or axis of movement are customizable such that a user can modify the keyboard to accommodate desired angles of supination/pronation, radial deviation/ulnar deviation, and flexion/extension, as well as the elevation of the hand(s) and wrist(s) of the user.

The angle of supination is the angle of upward rotation of the hand(s) and forearm(s) of the user, specifically the degree to which the palm(s) faces upward. The angle of pronation is the downward angle of rotation of the hand(s) and forearm(s) of the user, specifically the degree to which the palm(s) faces downward. The angle of radial/ulnar deviation is the angle formed between a reference line and a hand line as seen from a top down view, wherein the hand is moved to the right or left using the wrist. The reference line is herein defined as a line that passes through center of the forearm, the center of the wrist and extend out past the hand. A hand line is herein defined as a straight line passing through a straight middle finger and hand (e.g., a hand placed palm down on a table, with the fingers together and fully extended) to the point where it intersects the reference line. The angle of flexion/extension of the hand(s) and wrist(s) is herein defined as the angle formed by the intersection of the reference line and the hand line as seen from a side view.

The invention will now be discussed by way of example with reference to the accompanying drawings.

Figure 1:
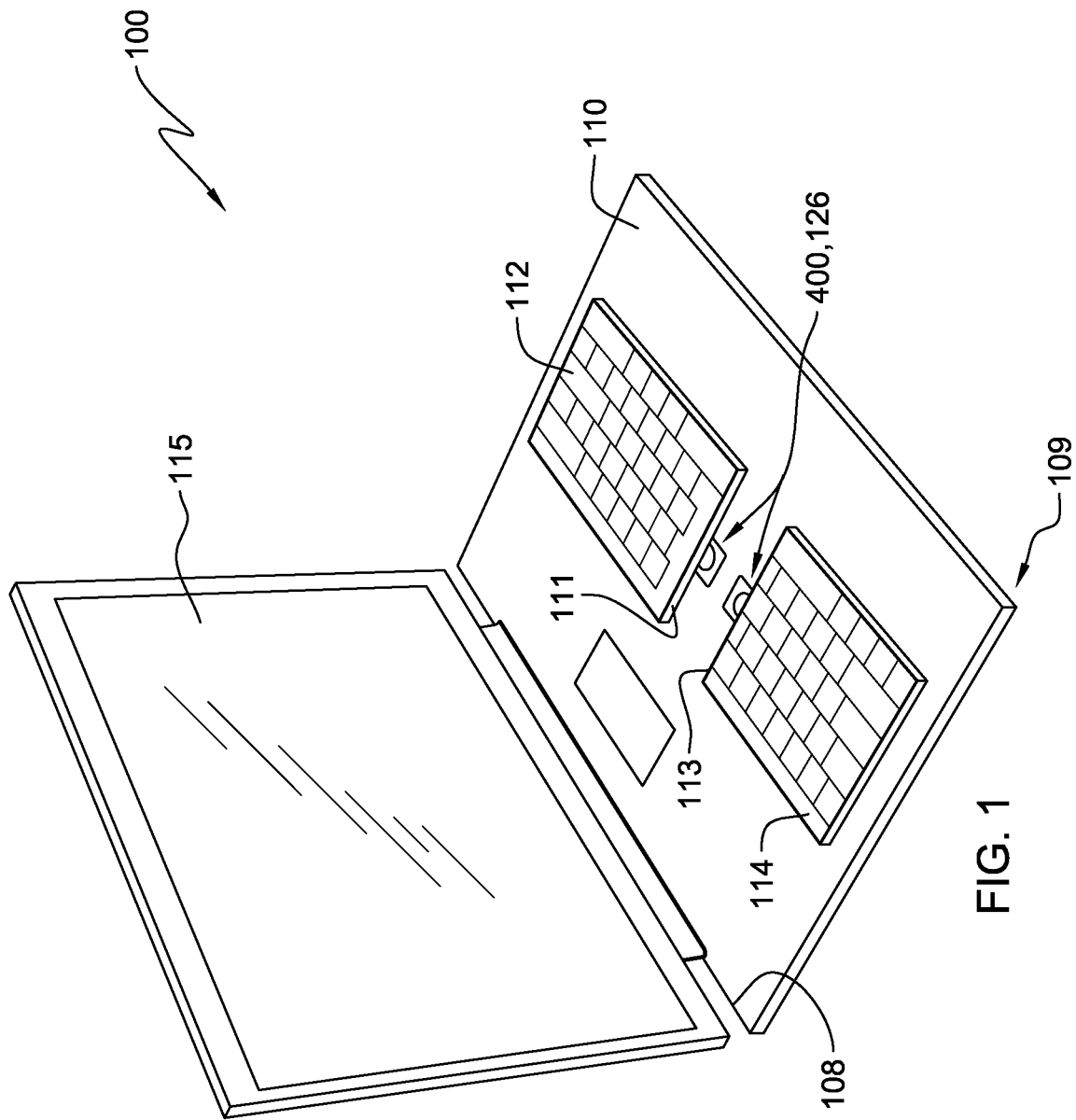
FIG. 1 is a perspective view of a computer that is configured to be closing ready, in accordance with an exemplary embodiment of the invention.

In FIG. 1, a computer 100 is depicted, in accordance with an exemplary embodiment of the invention. In general, the computer 100 illustrated in FIG. 1 is a portable computer that is configured to be closing ready, i.e., the keyboard is in a collapsed and locked configuration. The collapsed and locked configuration of the keyboard allows computer 100 to be closed, i.e., as in the configuration of a closed book. A computer 100, that is configured to be keyboard configuration ready, i.e., the keyboard is ready to be adjusted to a more ergonomic configuration is depicted in FIG. 2-6 with keyboard pieces that have been unlocked, adjusted and then re-locked into a more comfortable (ergonomic) configuration for use according to the desires of a user. In general, computer 100 can be a notebook computer or a netbook computer, i.e. a portable computer or computing device with a keyboard. Alternatively, computer 100 can be any type of computer that includes a keyboard.

In this exemplary embodiment, computer 100 includes two primary parts, namely a monitor 115 and a computer body 109. Computer body 109 is a base, which contains and provides connections for various components, in a manner more fully described below. Monitor 115 is connected to a top edge 108 of computer body 109. In general, the computer body 109 includes similar components to a standard laptop computer, as is known in the art, such as a keyboard, disk drive, and various I/O ports for connecting to peripheral devices such as a printer, external disc drive, etc., and may receive operating power from a battery or AC power source. Computer body 109 also includes a top face hereafter referred to as top face 110.

In this exemplary embodiment, monitor 115 of computer 100 can be a standard laptop or notebook computer monitor as is known in the art. Such monitors move back and forth, to flip up into an open position or fold down into a closed position, similar to the opening and closing of a book. In an alternate embodiment, monitor 115 comprises a gyroscopic connection to the computer, i.e., a connection which provides rotation or tilting of said monitor along at least two different axes, as opposed to current laptop and notebook monitors which rotate along one axis only. In an alternate embodiment, monitor 115 connects to the system unit using a gyroscopic ball or hinge, allowing it to rotate left and right in addition to opening up and folding down. Thus, a user can adjust the right to left angle of the monitor to show the screen to someone sitting on the left or right side, to avoid lighting problems such as glare or reflections on the screen (e.g. from a sunny window), to move the screen away from view by someone nearby, or as desired by a user.

Figure 2:
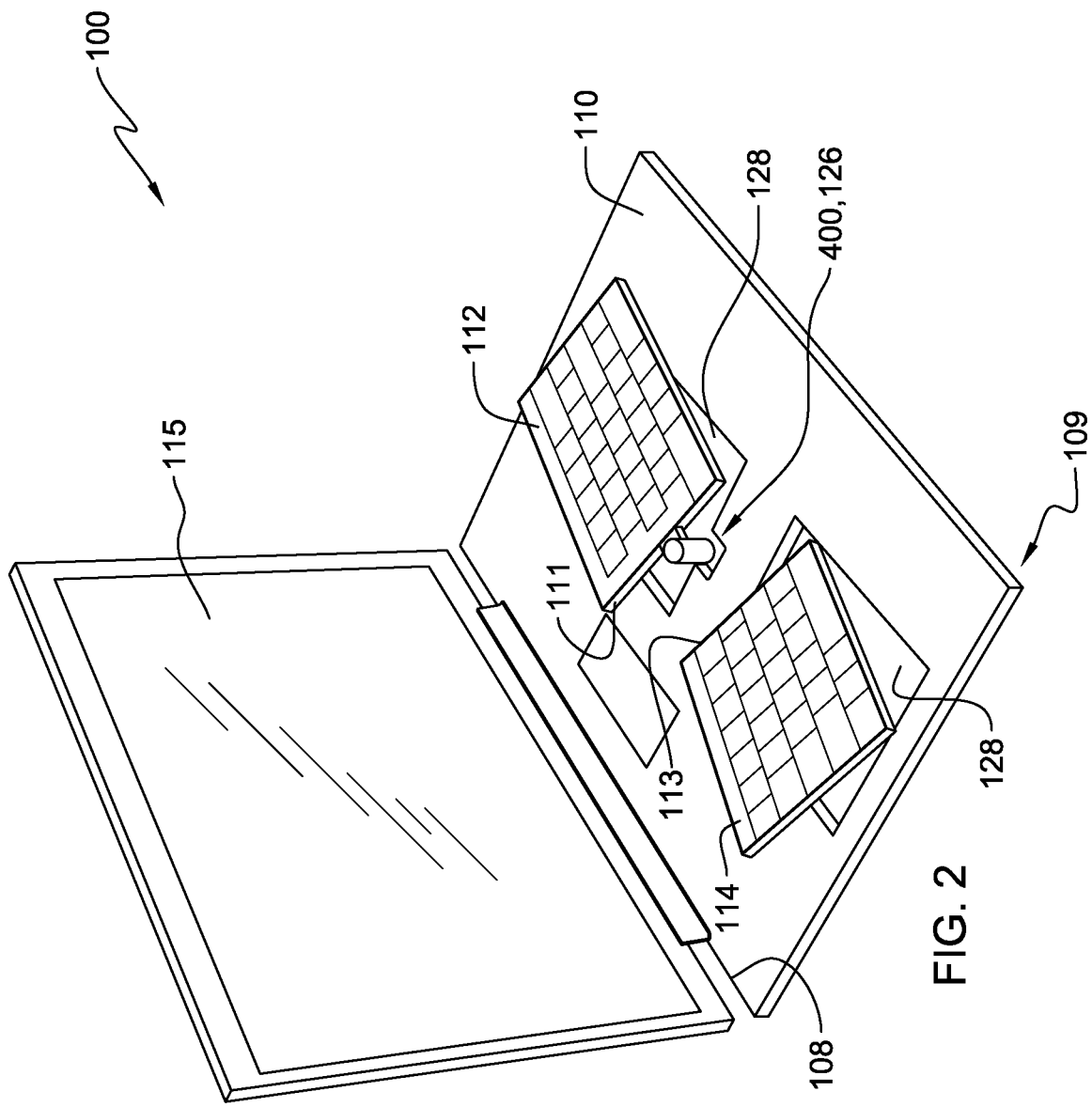
FIG. 2 is a perspective view of computer that is configured to be keyboard configuration ready, in accordance with an exemplary embodiment of the invention.

With continued reference to FIG. 1 and FIG. 2, top face 110 of computer body 109, included in computer 100, defines a keyboard mounting and/or location region. In some embodiments, the keyboard can be incorporated as a component of a computing device using, for example, a wired connection or a wireless connection. In this exemplary embodiment, the keyboard of computer 100 is divided in two position adjustable panels, herein referred to as first keyboard 114 and second keyboard 112. First keyboard 114 and second keyboard 112 are each attached to a given computer body 109 by a respective position adjustment device, herein referred to as a device 400, which is housed in a further respective cavity 126. In this exemplary embodiment, first keyboard 114 is attached to device 400 at keyboard edge 113 and second keyboard 112 is attached to device 400 at keyboard edge 111. However, the point of attachment of a given keyboard piece, e.g., first keyboard 114, can vary in other embodiments. Device 400 and cavity 126 will be discussed in greater detail below as applicable.

In this exemplary embodiment, computer 100 of FIG. 1 illustrates an open computer in a closing ready configuration with first keyboard 114 and second keyboard 112 collapsed and locked into top face 110. The collapsed and locked configuration of first keyboard 114 and second keyboard 112 allows computer 100 to be closed (i.e., as in the configuration of a closed book).

Figure 3:
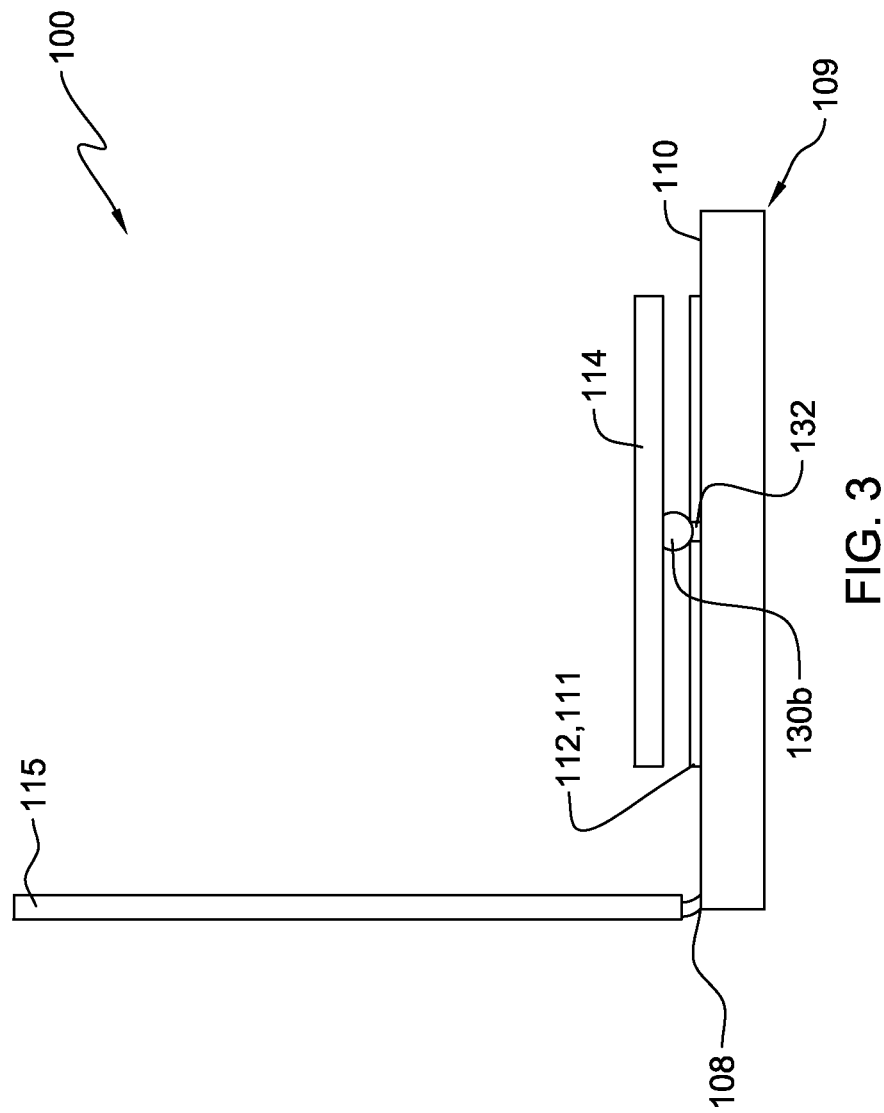
FIG. 3 is a side view of a portable computer illustrating a configuration ready keyboard piece and a closing ready keyboard piece, in accordance with an exemplary embodiment of the invention.

In this exemplary embodiment, first keyboard 114 and second keyboard 112 of computer 100 (FIG. 2) illustrate keyboard pieces that have been unlocked, adjusted and then re-locked into a more comfortable (ergonomic) configuration for use according to the desires of a user. The respective device 400 and cavity 126 of first keyboard 114 are eclipsed from view, by first keyboard 114, in FIG. 2 but still exist. When computer 100 is arranged to be keyboard configuration ready, the locking mechanisms respective to one or both first keyboard 114 and second keyboard 112 are released. Once released, first keyboard 114 and/or second keyboard 112 are elevated above top face 110 by device 400, as illustrated in FIG. 3. In this exemplary embodiment, the level of elevation of first keyboard 114 and second keyboard 112 above top face 110 is adjustable within the limits defined below (see the discussion of FIGS. 3 and 4).

Figure 4:
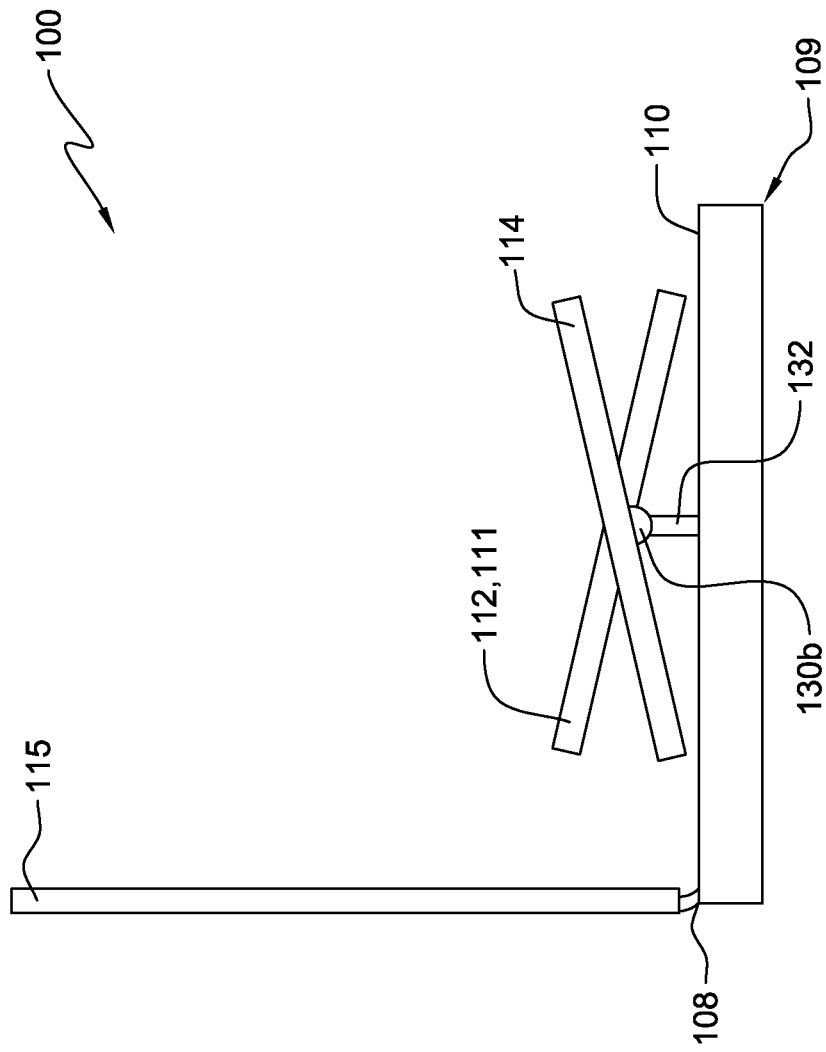
FIG. 4 is a side view of a portable computer, configured to be keyboard configuration ready, is illustrating keyboard pieces adjusted to the maximum elevation possible, in accordance with an exemplary embodiment of the invention.

In FIG. 3, a side elevated view of a computer 100 is illustrated with first keyboard 114 shown as elevated to the minimum elevation possible above top face 110 (i.e., keyboard configuration ready) while second keyboard 112 remains locked into the computer body 109, i.e., second keyboard 112 is configured to be closing ready. In FIG. 4, a side view of a computer 100 is illustrated with both first keyboard 114 and second keyboard 112 shown in the maximum elevation possible, for a keyboard of this embodiment, with first keyboard 114 tilted toward monitor 115 and top edge 108, while second keyboard 112 is tilted away from monitor 115 and top edge 108. The independent variation in respective elevation of first keyboard 114 and second keyboard 112 allow the height of first keyboard 114 and second keyboard 112 to be modified, within the limits of minimum and maximum elevation, according to user preferences. However, in this exemplary embodiment, a minimum elevation must be maintained to allow the full functioning of device 400, which requires the minimum elevation (clearance) for movement, tilting and pivoting (rotation) of first keyboard 114 and second keyboard 112.

The tilting and pivoting of first keyboard 114 and second keyboard 112 allow modification of the respective angles and declination associated with first keyboard 114, second keyboard 112 and of the respective angles of supination and pronation, radial deviation and ulnar deviation, and flexion and extension of the hand(s) and wrist(s) of the user.

In this embodiment, modified angles of declination respective to first keyboard 114 and second keyboard 112 are illustrated in FIG. 4. The angle of declination is herein defined as the angle made by a descending line, or plane, with a horizontal plane. Therefore, in this embodiment, the horizontal plane is computer body 109 and the descending plane is defined by the orientation of first keyboard 114 or second keyboard 112 respectively. By tilting first keyboard 114 or second keyboard 112 toward or away from monitor 115 and top edge 108 the respective angle of declination, between computer body 109 and first keyboard 114 or second keyboard 112, is changed and the associated angle of flexion and extension experienced by the hand(s) and wrist(s) of the user is thereby adjusted. In general, the tilting of first keyboard 114 and second keyboard 112 away from monitor 115 and top edge 108, i.e., the keys on the respective keyboard are not facing monitor 115, see FIG. 4, second keyboard 112, is considered the preferable configuration since such a configuration is typically known to reduce the level of strain experienced by the hand(s) and wrist(s) of most users. However, to provide added versatility, keyboards 114 and 112 of computer 100, can be tilted toward monitor 115 and top edge 108, i.e., see FIG. 4, wherein the keys on first keyboard 114 are facing monitor 115.

Figure 5:
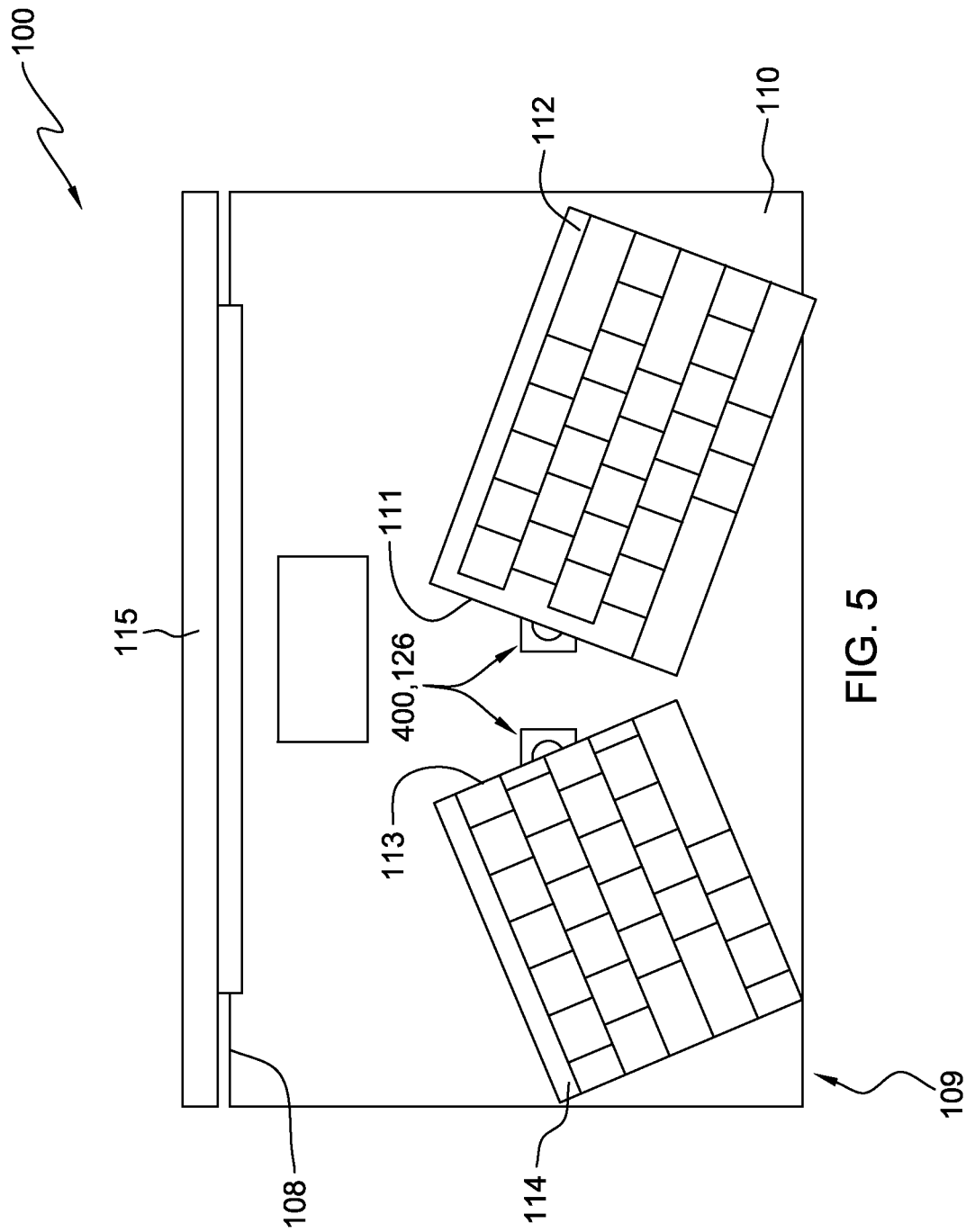
FIG. 5 is a top plan view of a portable computer, configured to be keyboard configuration ready, with both keyboard pieces rotated away from monitor, in accordance with an exemplary embodiment of the invention.

In this exemplary embodiment, first keyboard 114 and second keyboard 112 can be rotated toward or away from monitor 115 and top edge 108 to adjust the angle of radial deviation and ulnar deviation. In FIG. 5, a top down view of computer 100 is illustrated with first keyboard 114 and second keyboard 112 both depicted as rotated away from monitor 115 and top edge 108. In general, first keyboard 114 and second keyboard 112 are to be considered rotated away from monitor 115 and top edge 108 if respective keyboard side 113 and keyboard side 111, as shown in FIG. 5, are rotated such that they face monitor 115 and top edge 108. For example, in FIG. 5, a line extending perpendicular from keyboard side 113 would appear to move closer to monitor 115 as first keyboard 114 is rotated away from monitor 115 and top edge 108.

Figure 6:
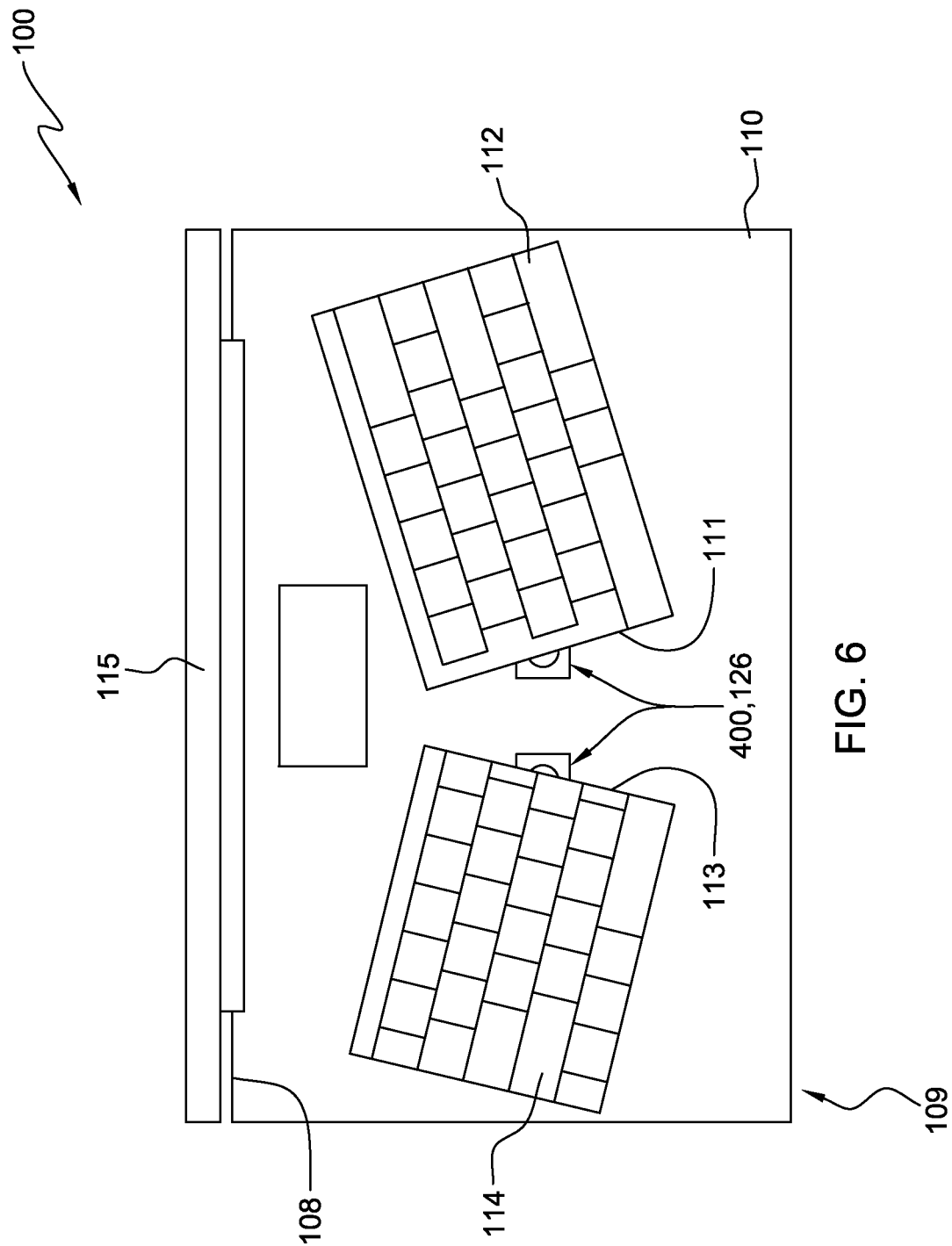
FIG. 6 is a top plan view of a portable computer, configured to be keyboard configuration ready, with both keyboard pieces rotated toward monitor, in accordance with an exemplary embodiment of the invention.

In FIG. 6, a top plan view of computer 100 is illustrated with first keyboard 114 and second keyboard 112 are rotated toward monitor 115 and top edge 108. Thus, respective keyboard side 113 and keyboard side 111 are rotated such that they face away from monitor 115 and top edge 108. For example, in FIG. 6, a line extending perpendicular from keyboard side 113 would appear to move away from monitor 115 and top edge 108 as first keyboard 114 is rotated toward from monitor 115 and top edge 108. In general, the rotation (adjustment) of first keyboard 114 and second keyboard 112 toward monitor 115 and top edge 108 is considered preferable since such a configuration is typically known to reduce the level of strain experienced by the wrist(s) of most users. However, to provide added versatility keyboards 114 and 112 can be rotated away from monitor 115 and top edge 108 (see the discussion of FIG. 3 for further details).

Figure 7:
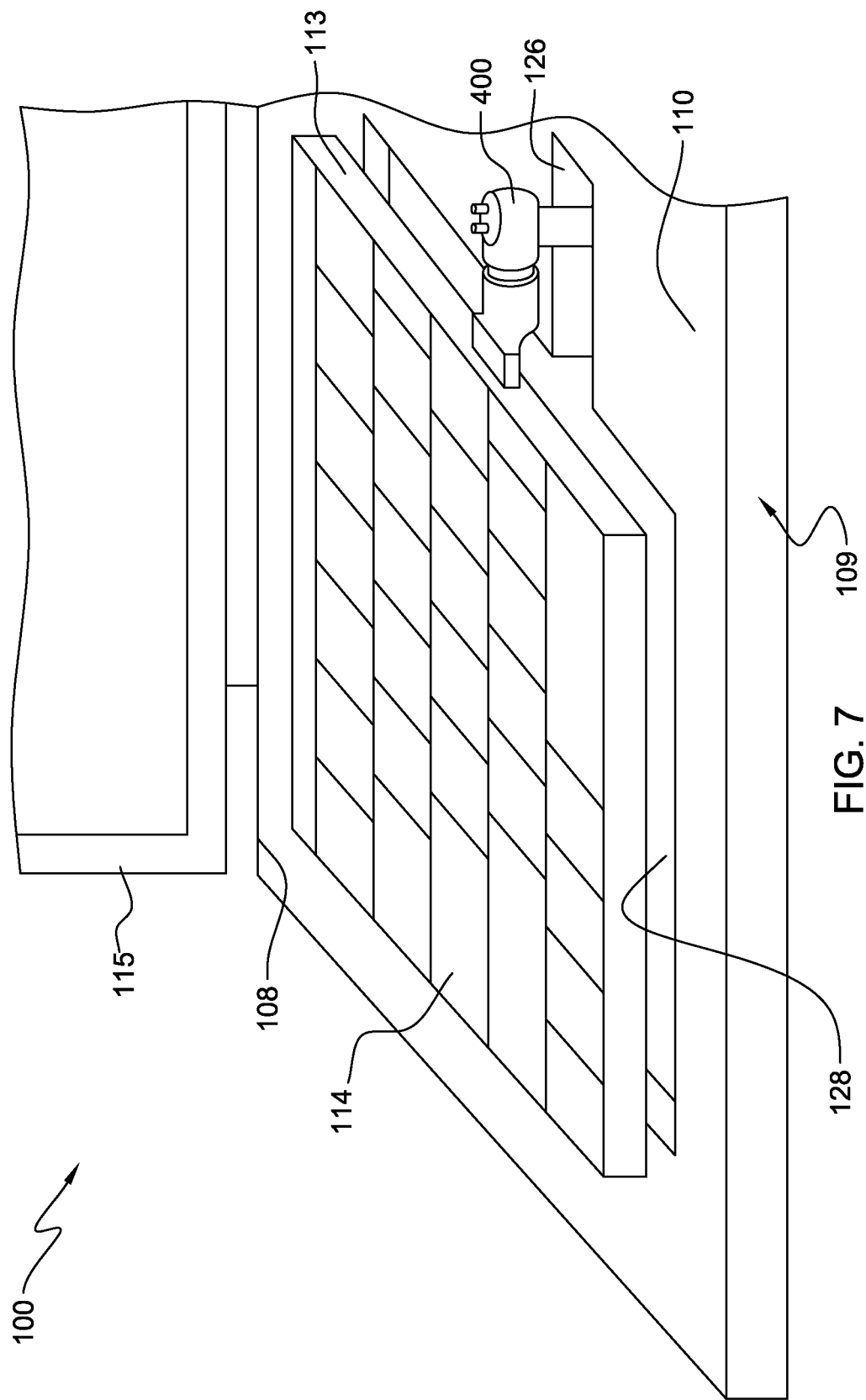
FIG. 7 is an enlarged view of a computer, configured to be keyboard configuration ready, with a keyboard piece, and associated keyboard position adjustment device, shown in the keyboard configuration ready configuration, in accordance with an exemplary embodiment of the invention.

In this exemplary embodiment, the computer 100 of FIG. 7 illustrates a close-up view of first keyboard 114 shown as elevated to the minimum elevation possible above top face 110, i.e., first keyboard 114 is configuration ready. The respective cavity 128 and cavity 126, which can respectively hold first keyboard 114 and respective device 400, are depicted in FIG. 7. In FIG. 7, only an upward section of device 400 is visible (see the discussion of FIG. 8 below for further details regarding device 400). In this exemplary embodiment, computer base 110 includes a cavity 128 of sufficient size and depth to allow storage, i.e., collapsed and locked into top face 110, of a respective first keyboard 114 or second keyboard 112 such that computer 100 can be configured into a closing ready configuration.

In this exemplary embodiment, computer base 110 includes cavity 126 of sufficient size and depth to allow storage of device 400 when computer 100 is configured into a closing ready configuration. In some embodiments, cavity 126 is also of sufficient dimensions to allow rotation of device 400 (and the associated first keyboard 114 or 112) toward and away from monitor 115 and top edge 108. Further details regarding the rotation of device 400 will be discussed later with regard to the discussion of FIG. 8.

In this exemplary embodiment, device 400 is a keyboard position adjustment device that provides the various tilting, rotational and other adjustment attributes associated with first keyboard 114 and second keyboard 112, as discussed above.

Figure 8:
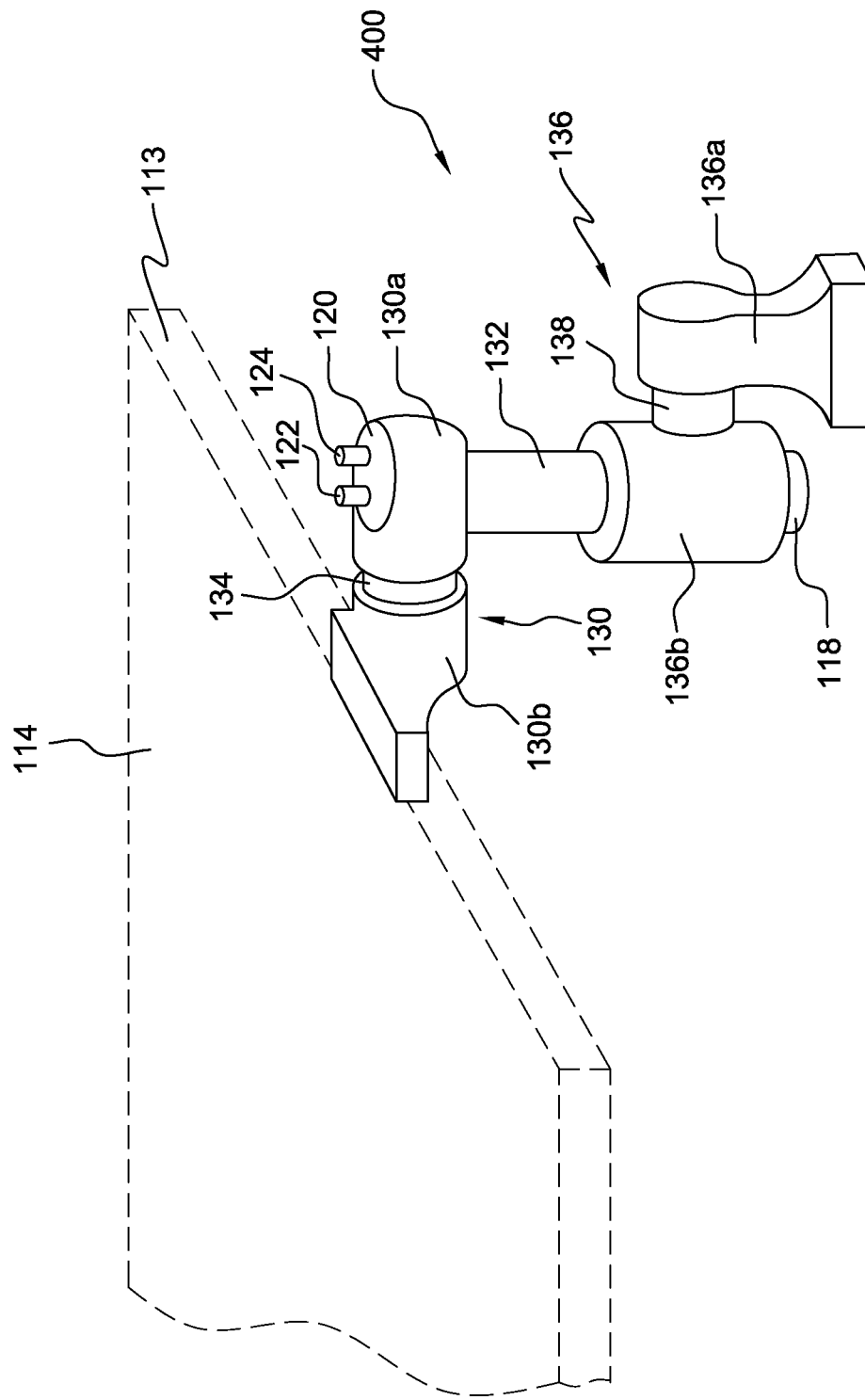
FIG. 8 is a detailed illustration of a keyboard position adjustment device, in accordance with an exemplary embodiment of the invention.

Although the discussion of FIG. 8 will be limited to device 400 attached to first keyboard 114, it is to be understood that similar properties and functionalities would apply to a given device 400 attached to second keyboard 112. In general, a simple device 400 can include as few as three parts, namely a first connector, a shaft 134, and a locking/releasing mechanism, all of which are described in detail below.

An exemplary embodiment of device 400, illustrated in FIG. 8, is connected to first keyboard 114 (which is shown as transparent to better illustrate the connectivity of device 400 and first keyboard 114). Device 400 attaches to first keyboard 114 using a first part 130b of a first connector 130 that facilitates rotatable connection of first keyboard 114 relative to second part 130a of first connector 130. In general, first connector 130 is composed of first part 130b and second part 130a. However, in this embodiment, first connector further includes a third optional component, an extendable/retractable shaft 134 (as illustrated in FIG. 8. By expanding and contracting shaft 134, first connector 130 extends and retracts in length, i.e., part 130a moves toward or away from 130b, thereby moving first keyboard 114 toward or away from second keyboard 112. Exemplary embodiments of first connector 130 allow the tilting, i.e., adjustment of the angle of declination, of first keyboard 114. First connector 130 is pivotably attached to the exterior surface of shaft 132 by second part 130a such that parts 130b and 134 can be rotated around shaft 132. In other embodiments, first connector 130 is pivotably attached to the interior surface of shaft 132 by second part 130a such that parts 130b and 134 can be rotated around shaft 132. The rotation of first connector 130 relative to shaft 132 provides an additional plane of movement (i.e., additional degree(s) of freedom) for first keyboard 114, which allows for adjustment of the angle of radial deviation and ulnar deviation associated with first keyboard 114. By rotating around shaft 134, edge 113 of first keyboard 114 is moved toward or away monitor 115 and top edge 108 as described in the discussions of FIGS. 5 and 6.

Shaft 132 is adjustable, in this exemplary embodiment, which allows first keyboard 114 to be raised and lowered. In this embodiment, first connector 130 is fixed to a top 120 of shaft 132 and it is through the raising and lowering of shaft 132 that first keyboard 114 is raised and lowered thereby providing the minimum and maximum elevation as described above. In an alternate embodiment, shaft 132 is fixed in place by attaching a bottom 118 of shaft 132 to computer base 110, to the bottom of cavity 126. First connector 130 can slide up and down a length of shaft 132 to provide the minimum and maximum elevation as described above, thereby yielding two of the three parts of a simple device 400. In yet other embodiments, first shaft 132 is composed of two or more nesting cylinders, or the like, that compose a shaft that is extendable and retractable (possibly using springs or hydraulics to assist in the movement).

In this exemplary embodiment, shaft 132 is attached to computer base 110, to the bottom of cavity 126, by second connector. In general, second connector 136 is composed of parts 136a and 136b. In this exemplary embodiment, part 136a is connected to the exterior surface of shaft 132 and allows the elevation of shaft 132 to be adjusted such that the elevation of first keyboard 114, relative to computer 110, is adjusted. In other embodiments, second connector 136 is rotatably attached to the interior surface of shaft 132 by second part 136a. Part 136b is rotatably attached to part 136a such that top 120 of shaft 132 can be rotated toward or away from monitor 115. Part 136a is attached to computer base 110, i.e., to the bottom of cavity 126. Thus, rotation of the top (120) of shaft 132 away from monitor 115 moves first keyboard 114 away from monitor 115. In this exemplary embodiment, second connector 136 further includes an optional third component, namely an extendable/retractable shaft 138 (as illustrated in FIG. 8). Extendable/retractable shaft 138 allows second connector 136 to expand and contract in length (i.e., part 136a moves toward or away from 136b) thereby changing the distance between first keyboard 114 and second keyboard 112. In some embodiments, the dimensions of cavity 126 may require modification to prevent first shaft 132 from impacting an edge or side of cavity 126, e.g., due to the degree of rotation of shaft 132 and/or the degree of extension of shaft 138 that are possible in a given embodiment.

Lastly, in this exemplary embodiment, device 400 includes locking and unlocking devices, parts 122 and 124 located on top 120 of shaft 132, that can be used to lock/unlock first keyboard 114 into/from a desired configuration. By engaging the locking device, the position of first keyboard 114 can be locked into place and further adjustment of the configuration of first keyboard 114 is inhibited. If a user desires to reconfigure the position of first keyboard 114 or to configure computer 100 into a closing ready configuration, the unlocking device can be engaged and first keyboard 114 re-adjusted to the next desired configuration.

Having described this invention with regard to specific embodiments, it is to be understood that the description is not meant as a limitation since further embodiments, modifications and variations may be apparent or may suggest themselves to those skilled in the art. It is intended that the present application cover all such embodiments, modifications and variations.

What is claimed is:

1. A configurable keyboard comprising:
   a base with a top face, and a top edge that is between a display device and the base;
   a plurality of position adjustable panels containing keyboard keys, each-position adjustable panel having a position adjustment device that corresponds to that position adjustable panel, each position adjustable panel being attached to the base by a corresponding position adjustment device, wherein orientations of the plurality of position adjustable panels are independently adjustable, wherein the plurality of position adjustable panels and their corresponding position adjustment devices are configured to recess, at least in part, into a cavity in the base;
   each position adjustment device including:
   a shaft, the shaft being attached towards a bottom end to the base, wherein the shaft is permanently connected to a fixed position of at least a portion of the base included in said cavity; and
   a first connector, the first connector connecting a position adjustable panel of the plurality of position adjustable panels to the shaft;
   wherein a position adjustment device that corresponds to the position adjustable panel facilitates adjustment of the position adjustable panel from a compact configuration to a customized configuration and has a range of rotation such that the position adjustable panel is rotatable toward the top edge.

2. The keyboard as in claim 1, wherein the first connector is pivotably attached to the shaft, towards a top end of the shaft, such that the position adjustable panel can be pivoted toward or away from the top edge of the base.

3. The keyboard as in claim 1, wherein the first connector is rotationally attached to the position adjustable panel, such that an angle of declination formed by a given position adjustable panel and the base can be adjusted by the rotation of said position adjustable panel.

4. The keyboard as in claim 1, wherein the position adjustment device adjusts a distance between the top face of the base and a given position adjustable panel to allow movement of the position adjustable panel such that various angles of supination and pronation, radial deviation and ulnar deviation, and flexion and extension of a hand and a wrist of a user are accommodated.

5. The keyboard as in claim 1, the first connector being pivotably attached towards a top end of the shaft and being attached to an exterior surface of the shaft.

6. The keyboard as in claim 5, the first connector being attached to the exterior surface of the shaft, the position of said first connector being adjustable along a length of the shaft.

7. The keyboard as in claim 1, the shaft, attached towards the bottom end to the base, is pivotably attached to said base.

8. The keyboard as in claim 1, the shaft, attached towards the bottom end to the base, further includes a second connector therebetween.

9. The keyboard as in claim 8, the second connector being attached to an exterior surface of the shaft.

10. The keyboard as in claim 9, the second connector being attached to an exterior surface of the shaft, the position of said second connector being adjustable along a length of the shaft.

11. The keyboard as in claim 8, the second connector being pivotably attached to the base.

12. The keyboard as in claim 8, the second connector being pivotably attached to the shaft.

13. The keyboard of claim 1, further including one or more locking and release mechanisms that lock one or more rotatable or adjustable elements of the position adjustment device preventing further adjustment or rotation, and unlock one or more of the rotatable or adjustable elements allowing further adjustment or rotation.

14. The keyboard as in claim 1, the base of the keyboard being incorporated into a body of at least one portable computing device, the portable computing device being one of a laptop computer, a netbook computer, or a notebook computer.

15. The keyboard as in claim 1, the keyboard being incorporated as a component of a computing device via a at least one of a wired connection or a wireless connection.

16. The keyboard as in claim 14, the portable computing device including a portable computer body, and a cavity in the body of the portable computing device with an opening to a top surface of the portable computer body, the cavity containing one or more of the position adjustable panel, first connector, second connector, and shaft when the portable computing device is in a closed configuration.

17. The keyboard as in claim 1, wherein the position adjustment device is attached to a side of the position adjustable panel.

* * * * *